A. SPIEGEL.
APPARATUS FOR SEPARATING LIQUID PARTICLES FROM GASES.
APPLICATION FILED MAR. 8, 1911.
1,075,736.
Patented Oct. 14, 1913.
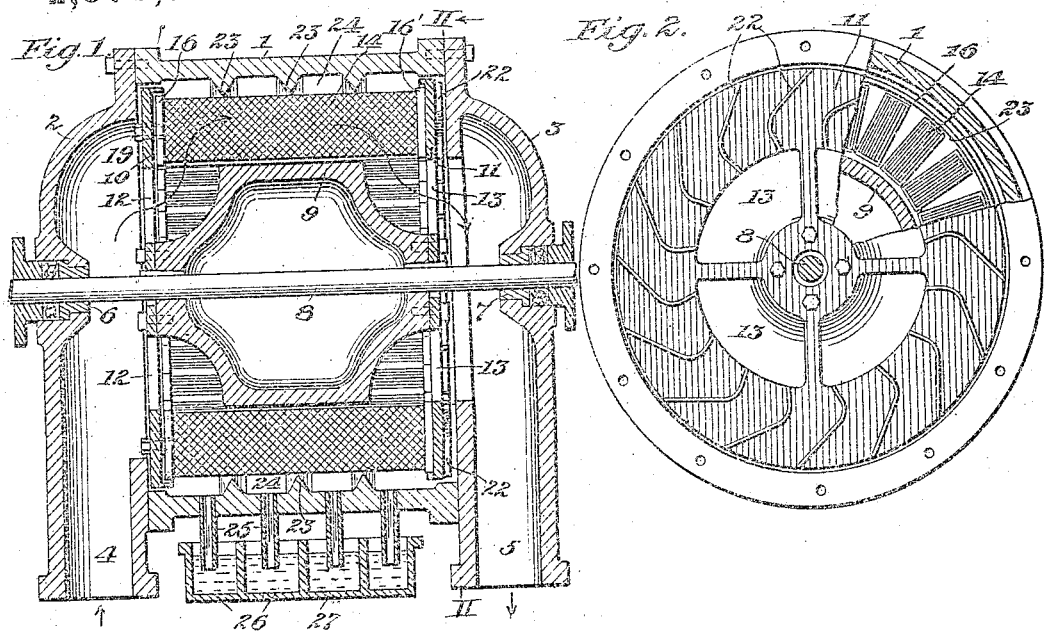
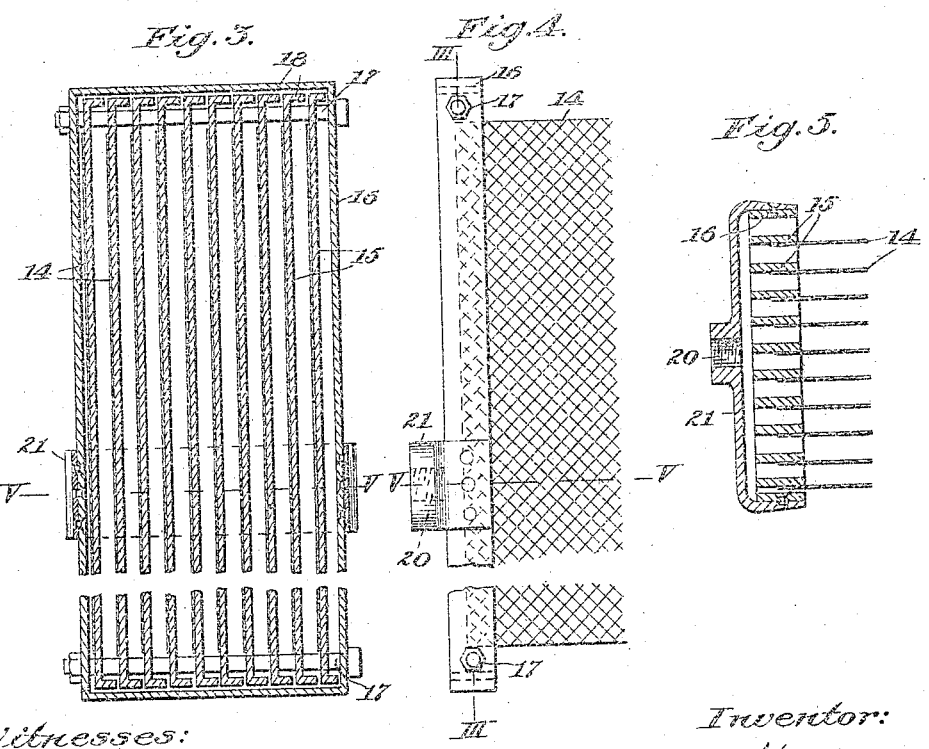

UNITED STATES PATENT OFFICE.

ADOLF SPIEGEL, OF GRUBE MESSEL, NEAR DARMSTADT, GERMANY, ASSIGNOR TO GEWERKSCHAFT MESSEL, OF GRUBE MESSEL, NEAR DARMSTADT, GERMANY.

APPARATUS FOR SEPARATING LIQUID PARTICLES FROM GASES.

1,075,736.   Specification of Letters Patent.   Patented Oct. 14, 1913.

Application filed March 8, 1911. Serial No. 613,156.

*To all whom it may concern:*

Be it known that I, ADOLF SPIEGEL, a citizen of the Empire of Germany, residing at Grube Messel, near Darmstadt, Germany, have invented certain new and useful Improvements in Apparatus for Separating Liquid Particles from Gases, of which the following is a specification.

It is possible by filtration to remove minute liquid particles suspended in gases or vapors, using a filtering medium of the degree of density or closeness possessed by a layer of cotton wool. Such filters however do not admit of a rapid passage of the gas and soon become choked. They are therefore not practicable for use on a large scale or for continuous working. Wire-gauze of microscopic smallness of mesh might answer the purpose in question, but it is neither available nor could it without much difficulty be kept free from deposit.

In the apparatus constructed according to the present invention the object in question is attained by the use, instead of the single dense gauze, of a group or series of wide-meshed sieves or screens, extended at some little distance from each other, a multiple arrangement of such sieves being caused to revolve with great velocity in a current of the gas to be treated. The wires or threads of which the sieves are composed are of extreme fineness; while the resistance which they meet with during their passage through the gas and the consequent absorption of power are thus reduced to a minimum, they yet strike and cut all the fine particles suspended in the gas, which thereupon adhere to the wires but are constantly thrown off by centrifugal force. Clogging of the sieves or screens is thus entirely avoided.

The preferred apparatus is shown in the accompanying drawing, in which—

Figure 1 is a vertical axial section; Fig. 2 is an end view, partly broken away, of the casing and revolving screen system, on the line II—II of Fig. 1; and Figs. 3, 4 and 5 are detail views, on a larger scale, of the ends of a group of screens and means for supporting them, Fig. 3 being a vertical transverse section on the line III—III of Fig. 4, and Fig. 5 being a horizontal section on the lines V—V of Figs. 3 and 4.

The apparatus illustrated comprises a casing consisting of the cylindrical body 1 and end-plates or hollow heads, 2, 3, bolted thereto. The end-plate 2 has a gas-inlet port 4 and the end-plate 3 has a gas-outlet port 5. Journaled in bearings 6, 7 in the end-plates is a horizontal shaft 8, on which is keyed a hollow circular drum 9, with reduced ends. Circular disks 10, 11, having gas-passages 12, 13, are bolted to the ends of the drum. Stretched between and carried by these disks are groups of screens 14, here shown as wide-meshed sieves consisting of very fine crossed wires. In the machine illustrated, about twenty-five such groups of ten sieves each are employed. Each sieve is stretched longitudinally, in a substantially radial plane, its ends being secured to vertical bars 15. The bars at each end of each group of sieves are secured in a rectangular frame 16 or 16', by bolts 17 which pass through holes in the upper and lower ends of the frame and set of bars. The ends of the bars 15 have right-angular flanges 18, which serve to suitably space the bars and the screens 14. The frames 16' adjacent to the disk 11 are secured directly thereto. The frames 16 adjacent to the disk 10 are secured indirectly thereto by tension-bolts 19, which pass loosely through holes in the disk and enter threaded openings 20 in a yoke 21 which embraces and is riveted to the frame near its middle. Carried by and extending from the outer face of the disk 11 are a series of short fan-blades 22, which extend into close proximity to the end-plate 3. The disk 10 revolves in close proximity to the end-plate 2. Integral with and projecting from the inner face of the casing-body 1 are several sharp-edged annular ribs 23, shown as three in number, providing intermediate channels 24. Short drip-pipes 25 extend downward from the lowermost portions of these channels through the body 1 and into separate compartments 26 of a receptacle 27, wherein their outlets are sealed by liquid.

In operation, the shaft 8, drum 9 and screens 14 are rapidly rotated. The gas to be treated is then introduced through the port or pipe 4, passes from the chamber of end-plate 2 through the openings 12 in disk 10, thence flows longitudinally around the drum 9 and between the screens 14, and escapes through the disk-openings 13, the chambered end-plate 3 and outlet-port 5. The wires of the numerous screens 14 cut ting through the gas strike all of the fine liquid particles suspended in the gas, and these particles temporarily adhere to the wires until the liquid collects thereon in sufficient amount to be thrown off by centrifugal force, whereupon it strikes the inner surface of the casing-body 1, runs down in the channels 24, and finally drops through the pipes 25 into the receptacles 26. The fan-blades 22 are so positioned with reference to the normal direction of rotation of the drum and screens that they tend to force the gas outward through the space between the disk 11 and end-plate 3, thereby preventing any leakage of gas around the periphery of this end-plate and forcing all of it to travel in the direction indicated by the arrows.

I claim:

1. In combination, a casing, a revolving member carrying longitudinally-arranged spaced screens, and gas-inlet and outlet conduits directly opening into the ends of the spaces between said screens, said conduits and spaces providing unbroken longitudinal passages.

2. In combination, a circular casing, a revolving member carrying a circular series of longitudinally-arranged spaced radial screens, and gas-inlet and outlet conduits directly opening into the ends of the spaces between said screens, said conduits and spaces providing unbroken longitudinal passages.

3. In combination, a casing, a revolving set of longitudinally-arranged spaced screens of fine wire, gas-inlet and outlet conduits communicating with the spaces between said screens, and means for rapidly moving said screens transversely to the current of gas, whereby their wires are brought into intimate contact with all portions of the gas, momentarily collect the fine particles suspended therein, and then throw them outward toward said casing.

4. In combination, a casing comprising an annular body and end-plates with gas-inlet and outlet conduits, and a drum journaled axially in said casing and carrying an annular series of longitudinally-arranged spaced radial screens, said screens extending into proximity to said end-plates, said conduits and the spaces between said screens providing unbroken longitudinal passages.

5. In combination, a casing comprising an annular body and end-plates with gas-inlet and outlet ports, a drum journaled axially in said casing, apertured disks fixed on the ends of said drum adjacent to said end-plates, and a series of spaced screens, having their planes parallel to the path of the gas, stretched between said disks.

6. In combination, a casing comprising an annular body and end-plates with gas-inlet and outlet ports, a drum journaled axially in said casing, apertured disks fixed on the ends of said drum adjacent to said end-plates, an annular series of spaced radial screens stretched between said disks, and a series of short fan-blades on the outer face of one disk and extending nearly to the adjacent gas-outlet end-plate.

7. In combination, a casing comprising an annular body and end-plates with gas-inlet and outlet ports, a drum journaled axially in said casing, apertured disks fixed on the ends of said drum adjacent to said end-plates, a series of spaced screens, having their planes parallel to the path of the gas, stretched between said disks, and liquid-outlets extending through said casing-body.

8. In combination, a casing comprising an annular body and end-plates with gas-inlet and outlet ports, a drum journaled axially in said casing, apertured disks fixed on the ends of said drum adjacent to said end-plates, an annular series of spaced radial screens stretched between said disks, and a series of short fan-blades on the outer face of one disk and extending nearly to the adjacent gas-outlet end-plate, the body of said casing having internal channels leading to liquid-outlets.

In testimony whereof, I affix my signature in presence of two witnesses.

ADOLF SPIEGEL.

Witnesses:
 OTTO HÖCHBERG,
 CARL MÜLLER.

Copies of this patent may be obtained for five cents each, by addressing the "Commissioner of Patents, Washington, D. C."